United States Patent
Lin et al.

(10) Patent No.: US 9,967,192 B2
(45) Date of Patent: May 8, 2018

(54) OFFLOADING OF MANAGEMENT CONTROLLER TRAFFIC

(71) Applicant: Quanta Computer Inc., Taoyuan (TW)

(72) Inventors: Li-Min Lin, Taoyuan (TW); Chih-Chia Huang, Taoyuan (TW); Ying-Chin Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 83 days.

(21) Appl. No.: 15/049,941

(22) Filed: Feb. 22, 2016

(65) Prior Publication Data

US 2017/0244640 A1    Aug. 24, 2017

(51) Int. Cl.
*H04L 12/803* (2013.01)
*H04L 29/08* (2006.01)
*H04L 12/26* (2006.01)
*H04L 12/947* (2013.01)
*H04L 12/931* (2013.01)

(52) U.S. Cl.
CPC .......... *H04L 47/125* (2013.01); *H04L 43/08* (2013.01); *H04L 49/25* (2013.01); *H04L 49/70* (2013.01); *H04L 67/1004* (2013.01)

(58) Field of Classification Search
CPC ... H04L 47/125; H04L 67/1004; H04L 43/08; H04L 49/25; H04L 49/70
See application file for complete search history.

(56) References Cited

U.S. PATENT DOCUMENTS

| | | | | |
|---|---|---|---|---|
| 2003/0076832 A1* | 4/2003 | Ni | ....................... | H04L 12/5601 370/395.1 |
| 2010/0125655 A1* | 5/2010 | Elzur | ..................... | H04L 41/24 709/223 |
| 2012/0124398 A1* | 5/2012 | Diab | ................... | H04L 41/0833 713/310 |
| 2016/0378570 A1* | 12/2016 | Ljubuncic | ............. | G06F 9/5027 718/104 |

FOREIGN PATENT DOCUMENTS

CN    102510344 A    6/2012
TW    201242299 A1   10/2012

OTHER PUBLICATIONS

English Translation of CN102510344. Hwawei Tech Co. Ltd. Pub. Date: Jun. 20, 2012. Retrieved from the Internet <URL: http://translationportal.epo.org/emtp/translate/?ACTION=description-retrieval&COUNTRY=CN&ENGINE=google&FORMAT=docdb&KIND=A&LOCALE=en_EP&Number=102510344&OPS=ops.epo.org/3.2&SRCLANG=zh&TRGLANG=en>. pp. 1-6.*

English Translation of QCI-104059-TW. Translation received Jul. 7, 2017 from STIC. Original TW Office action dated Dec. 8, 2016. pp. 1-10.*

Taiwanese Office Action No. 105112960 for Application No. 10521515680 dated Dec. 8, 2016 w/ English First Office Action Summary Table.

* cited by examiner

*Primary Examiner* — Omar J Ghowrwal

(74) *Attorney, Agent, or Firm* — Nixon Peabody LLP; Eduardo J. Quinones; Zhou Lu

(57) ABSTRACT

A system for offloading management controller traffic includes a data port, an out-of-band port, and a leaf switch. The leaf switch includes a switch application-specific integrated circuit (ASIC) and an unmanaged chip directly connected to the switch ASIC. The switch ASIC is configured to direct data traffic to the data port and offload baseboard management controller (BMC) traffic to the unmanaged chip. The unmanaged chip is configured to direct the BMC traffic to the out-of-band port.

21 Claims, 4 Drawing Sheets

300

310 — DIRECTING, BY A SWITCH APPLICATION-SPECIFIC INTEGRATED CIRCUIT (ASIC), DATA TRAFFIC TO A DATA PORT

320 — OFFLOADING, BY THE SWITCH ASIC, MANAGEMENT TRAFFIC TO AN UNMANAGED CHIP, WHERE THE UNMANAGED CHIP IS DIRECTLY CONNECTED TO THE SWITCH ASIC

330 — DIRECTING, BY THE UNMANAGED CHIP, THE MANAGEMENT TRAFFIC TO AN OUT-OF-BAND PORT

FIG. 3

OFFLOADING OF MANAGEMENT CONTROLLER TRAFFIC

BACKGROUND

Field

This application relates to computer systems, and more particularly to a system and method for offloading management controller traffic to out-of-band.

Background

Computer server systems in modern data centers are commonly mounted in specific configurations on server racks for which a number of computing modules, such as server trays, server chassis, server sleds, server blades, etc., are positioned and stacked relative on top of each other within the server racks. Rack mounted systems allow for vertical arrangement of the computing modules to use space efficiently. Generally, each computing module can slide into and out of the server rack, and various cables such as input/output (JO) cables, network cables, power cables, etc., connect to the computing modules at the front or rear of the rack. Each computing module contains one or more computer servers or may hold one or more computer server components. For example computing modules includes hardware circuitry for processing, storage, network controllers, disk drives, cable ports, power supplies, etc.

Each computing module can be connected to a network such as an Ethernet network. Ethernet has been the most widely used networking standard for connecting computers in both Local Area Networks (LANs) and Wide Area Networks (WANs). Ethernet devices communicate by transmitting data packets, which comprise blocks of data that are individually sent and delivered. Ethernet defines a number of wiring and signaling standards for the physical layer (PHY), through means of network access at the Data Link Layer, and through a common addressing format.

Typical server systems each include a management controller, such as a baseboard management controller (BMC), which is a specialized microcontroller embedded on the motherboard of the server system. The BMC manages the interface between system management software and platform hardware. Different types of sensors built into the computer system report to the BMC on parameters such as temperature, cooling fan speeds, power status, operating system status, etc. The BMC monitors the sensors and has the ability to send alerts to an administrator over the Ethernet network if any of the parameters do not stay within preset limits, indicating a potential failure of the server system. The administrator can remotely communicate with the BMC over the Ethernet network to take some corrective action such as resetting or power cycling the system to restore functionality.

Some current server systems separate traffic between the BMC and the administrator from data traffic from the server systems. The traffic is separated using a management switch placed in a top-of-rack (TOR) of a server rack. Separating data traffic from BMC traffic ensures that BMC traffic will not be affected data traffic congestion. However, the necessity of the management switch consumes space from the server rack and adds to the cost of the server rack.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a system includes a data port, an out-of-band port, and a leaf switch. The leaf switch includes a switch integrated circuit and an unmanaged chip directly connected to the switch integrated circuit. The switch integrated circuit is configured to direct data traffic to the data port and offload baseboard management controller (BMC) traffic to the unmanaged chip. The unmanaged chip is configured to direct the BMC traffic to the out-of-band port.

In some implementations, a method includes directing, by a switch integrated circuit, data traffic to a data port. The switch integrated circuit offloads baseboard management controller (BMC) traffic to an unmanaged chip, where the unmanaged chip is directly connected to the switch integrated circuit. The unmanaged chip directs the BMC traffic to an out-of-band port.

In some implementations, a system includes a data port, an out-of-band port, and a leaf switch. The leaf switch includes a processor, a switch integrated circuit connected to the processor, and an unmanaged chip connected to the processor and directly connected to the switch integrated circuit. The switch integrated circuit is configured to direct data traffic to the data port and offload baseboard management controller (BMC) traffic to the unmanaged chip. The unmanaged chip is configured to direct the BMC traffic to the out-of-band port. The system further includes a BMC connected to the processor and to the unmanaged chip.

BRIEF DESCRIPTION OF THE DRAWINGS

These and other sample aspects of the present technology will be described in the detailed description and the appended claims that follow, and in the accompanying drawings, wherein:

FIG. 3 illustrates an example methodology for offloading management controller traffic.

DETAILED DESCRIPTION

The subject disclosure provides techniques for offloading management controller traffic to out-of-band. Various aspects of the present technology are described with reference to the drawings. In the following description, for purposes of explanation, numerous specific details are set forth in order to provide a thorough understanding of one or more aspects. It is evident, however, that the present technology can be practiced without these specific details. In other instances, well-known structures and devices are shown in block diagram form in order to facilitate describing these aspects.

Figure 1:
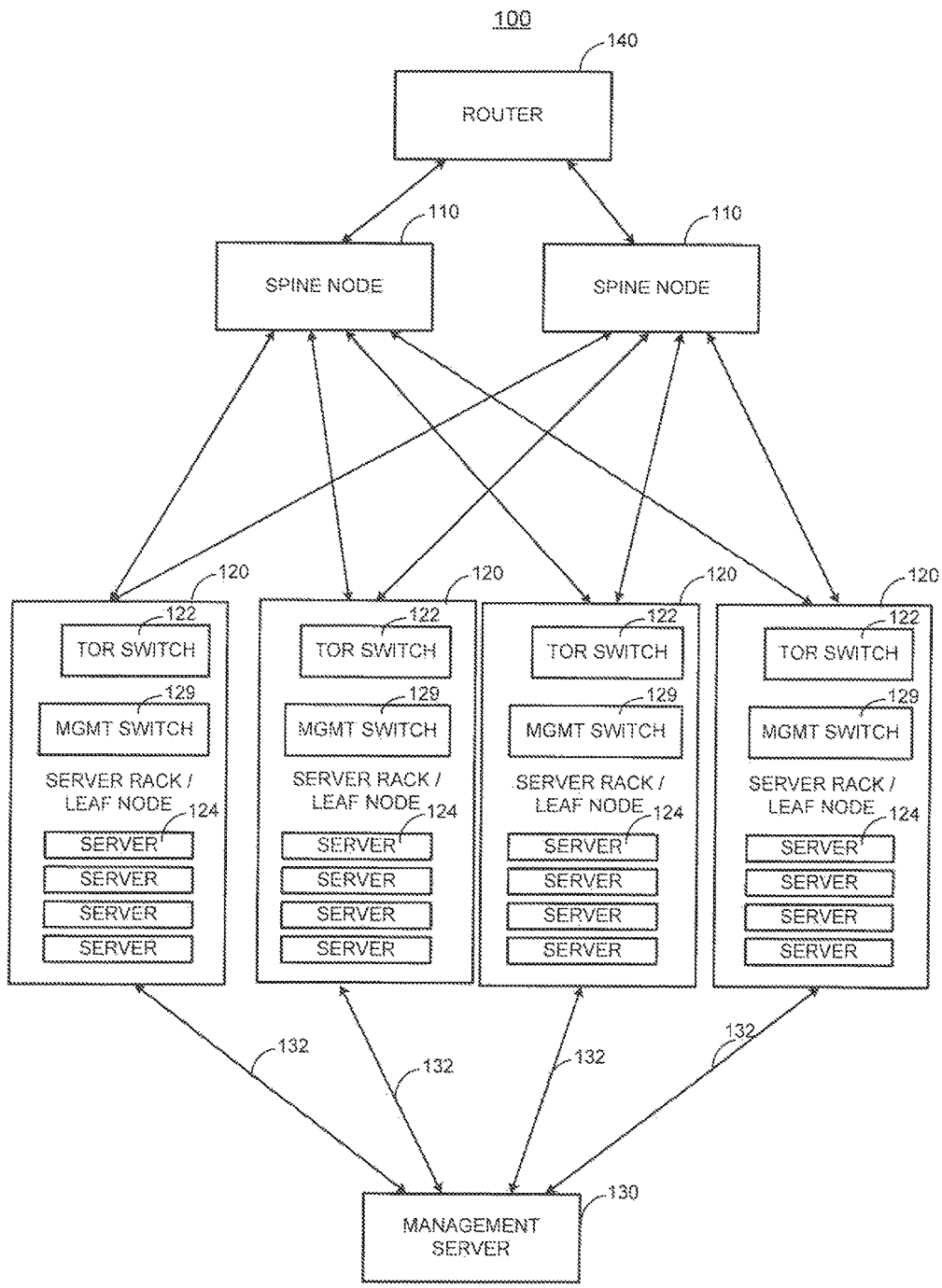
FIG. 1 illustrates a block diagram of an example system for offloading management controller traffic.

FIG. 1 illustrates a block diagram of an example system 100 for offloading management controller traffic. In some implementations, the system 100 includes multiple server racks (i.e., leaf nodes) 120 making up a first tier (i.e., leaf layer) of a leaf-spine network topology. Each server rack functioning as a leaf node 120 includes a top-of-rack (TOR) switch 122 and one or more servers 124. Each of the servers 124 includes a management controller, such as for example, a baseboard management controller (BMC), connected to the TOR switch via Network Interface Card (NIC). One or more spine nodes 110 make up a second tier (i.e., spine layer) of the leaf-spine network topology 100 and connect to a router 140. Each of the spine nodes 110 connect to the router 140. For example, the router 140 is a Local Area Network (LAN) or a Wide Area Networks (WAN).

A leaf layer includes leaf nodes 120, each including a leaf switch (i.e., TOR switch 122) that connects to devices. A spine layer which includes spine nodes 110, each including a spine switch, is the backbone of the network, where every leaf node 120 is interconnected with each and every spine node 110.

In some implementations, each of the servers in the leaf nodes 120 is connected to the front ports (or data ports) of a management switch 129. The manager server 130, which is a computer, tablet or mobile device used by an administrator, can indirectly connect to the management switch 129. In some aspects, the management server 130 monitors system health information sent from each BMC. The management server 130 also allows the administrator to remotely manage the BMC of each server 124.

In some implementations, the TOR switch 122 can integrate the functions of the management switch 129 but separates the data traffic and BMC traffic to offload the BMC traffic from out-of-band port toward manager server 130. The data traffic from each of the servers 124 in the server racks 120 moves through the leaf-spine network to the router 140. The management traffic moves between the management server 130 and the TOR switch 122 through an out-of-band path 132.

Out-of-band refers to the use of a dedicated path for managing network devices such as the servers 124 in the server rack 120. Out-of-band management can be used to ensure management connectivity independent of the status of other non-out-of-band network components. Out-of-band management allows an administrator to remotely monitor and manage servers and other network-attached equipment regardless of whether the devices are powered on, or if an operating system is installed or functional. By contrast, in-band management is based on in-band connectivity and installed software that can only run after the operating system has started.

Figure 2:
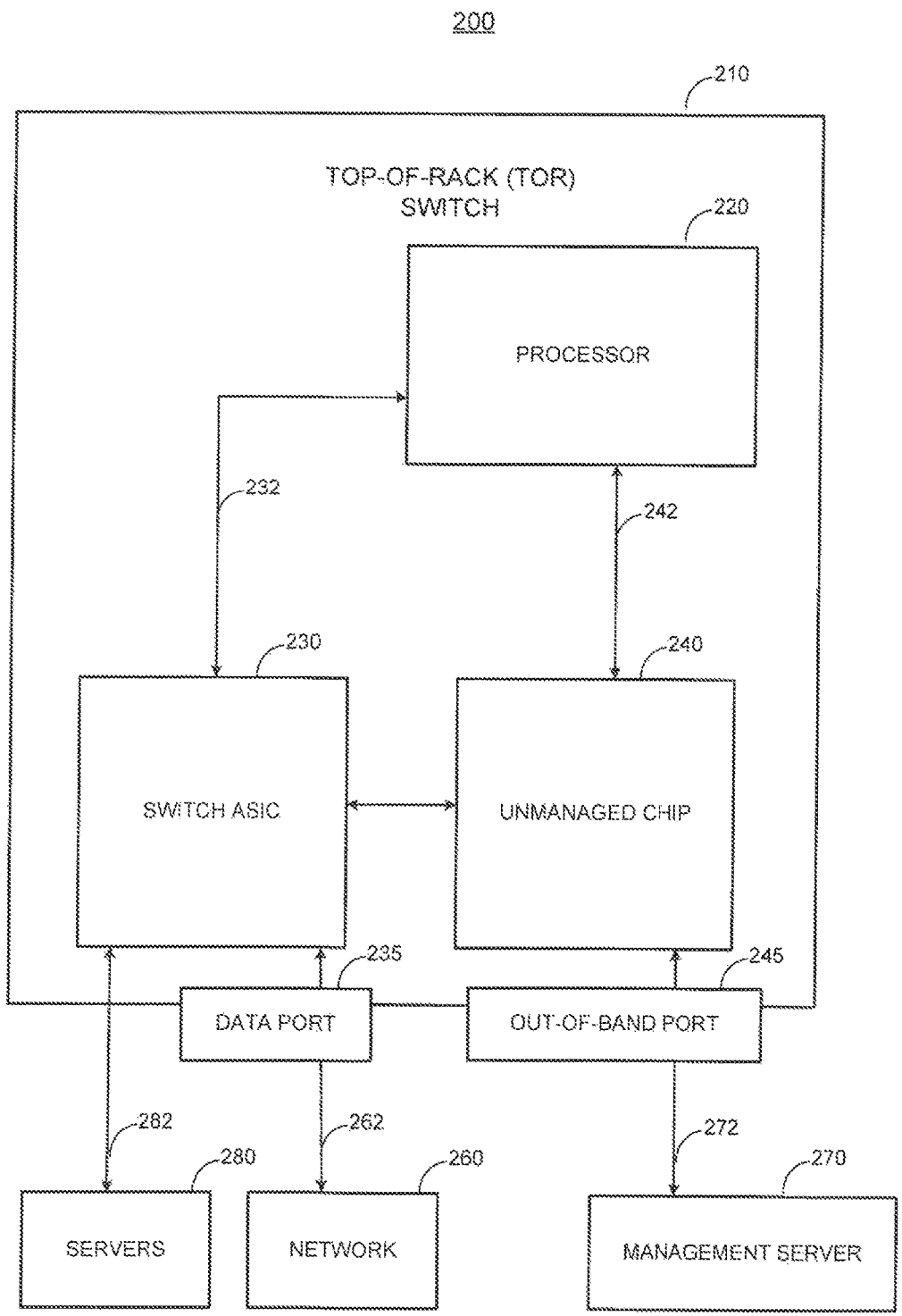
FIG. 2 illustrates a block diagram of an example system for offloading management controller traffic.

FIG. 2 illustrates a block diagram of an example system 200 for offloading management controller traffic. In some implementations, the system 200 includes a TOR switch 210 in a server rack that connects to one or more BMC of each of one or more servers 280 in the server rack. In some implementations, the TOR switch 210 includes a processor 220, a switch application-specific integrated circuit (ASIC) 230, and an unmanaged chip 240.

A network switch (e.g., an Ethernet switch) is a device used on a computer network to physically connect devices together. Multiple cables are connected to a switch to enable networked devices to communicate with each other. Switches manage the flow of data across a network by only transmitting a received message to the device for which the message was intended. Each networked device connected to a switch is identified using a media access control (MAC) address, allowing the switch to regulate the flow of traffic. Switches include application specific integrated circuits (ASICs) to build and maintain MAC address tables.

The switch ASIC 230 of the TOR switch 210 connects to a network 260, using connection 262, through a data port 235. For example, the network 260 is a Local Area Network (LAN) or a Wide Area Networks (WAN). An ASIC is an integrated circuit customized for a specific use, rather than for general-purpose use, for greater efficiency at the specific use. The switch ASIC 230 connects to the servers 280 using connection 282.

The switch ASIC 230 is configured to direct outbound data traffic from the servers 280 to the network 260, through the data port 235 and connection 262. The switch ASIC 230 is further configured to offload outbound BMC traffic from the BMCs of the servers 280 to the unmanaged chip 240. The outbound BMC traffic includes management traffic between the management server 270 and the BMCs of the servers 280.

The switch ASIC 230 is further configured to direct inbound data traffic from the network 260 to the servers 280. The switch ASIC 230 is further configured to direct inbound BMC traffic (originating from the management server 270) from the unmanaged chip 240 to the BMCs of the servers 280.

The unmanaged chip 240 of the TOR switch 210 connects to a management server 270 using an out-of-band connection 272, through an out-of-band port 245. For example, the management server 270 is a computer, tablet or mobile device used by an administrator of the one or more servers in the server rack.

Unmanaged chips can include switches with no remote configuration, management, or monitoring options. However, some unmanaged chips can be locally monitored and configured via light emitting diode (LED) indicators and dual in-line package (DIP) switches. A DIP switch is a manual electric switch that is packaged with others in a group in a standard dual in-line package (DIP). These switches are typically less expensive than managed switches.

In contrast to unmanaged chips, managed switches support Simple Network Management Protocol (SNMP) via embedded agents and have a command line interface (CLI) that can be accessed using serial console, Telnet, and Secure Shell. Managed switches can often be configured and managed as groups.

In some implementations, the unmanaged chip 240 is configured to direct outbound BMC traffic from the switch ASIC 230 to the out-of-band port 245. In some aspects, the unmanaged chip 240 uses a MAC table and a virtual local area network (VLAN) configuration to direct the BMC traffic to the out-of-band port 245.

The switch ASIC 230 connects to the processor 220 using connection 232. In some aspects, connection 232 is a Peripheral Component Interconnect (PCI), Peripheral Component Interconnect Express (PCIe), or the like. PCI uses a shared parallel bus architecture, in which the PCI host and all devices share a common set of address, data and control lines. In contrast, PCIe uses point-to-point topology, with separate serial links connecting every device to a host. In terms of bus protocol, PCIe communication is encapsulated in packets.

The unmanaged chip 240 connects to the processor 220 using connection 242. In some aspects, the connection 242 is a serial gigabit media independent interface (SGMII) interface or a serializer/deserializer (SerDes) interface.

FIG. 3 illustrates an example methodology for offloading management controller traffic. The method 300 involves, at step 310, directing, by a switch application-specific integrated circuit (ASIC), data traffic to a data port.

The method 300 involves, at step 320, offloading, by the switch ASIC, baseboard management controller (BMC)

traffic to an unmanaged chip, where the unmanaged chip is directly connected to the switch ASIC.

The method 300 involves, at step 330, directing, by the unmanaged chip, the BMC traffic to an out-of-band port.

Figure 4:
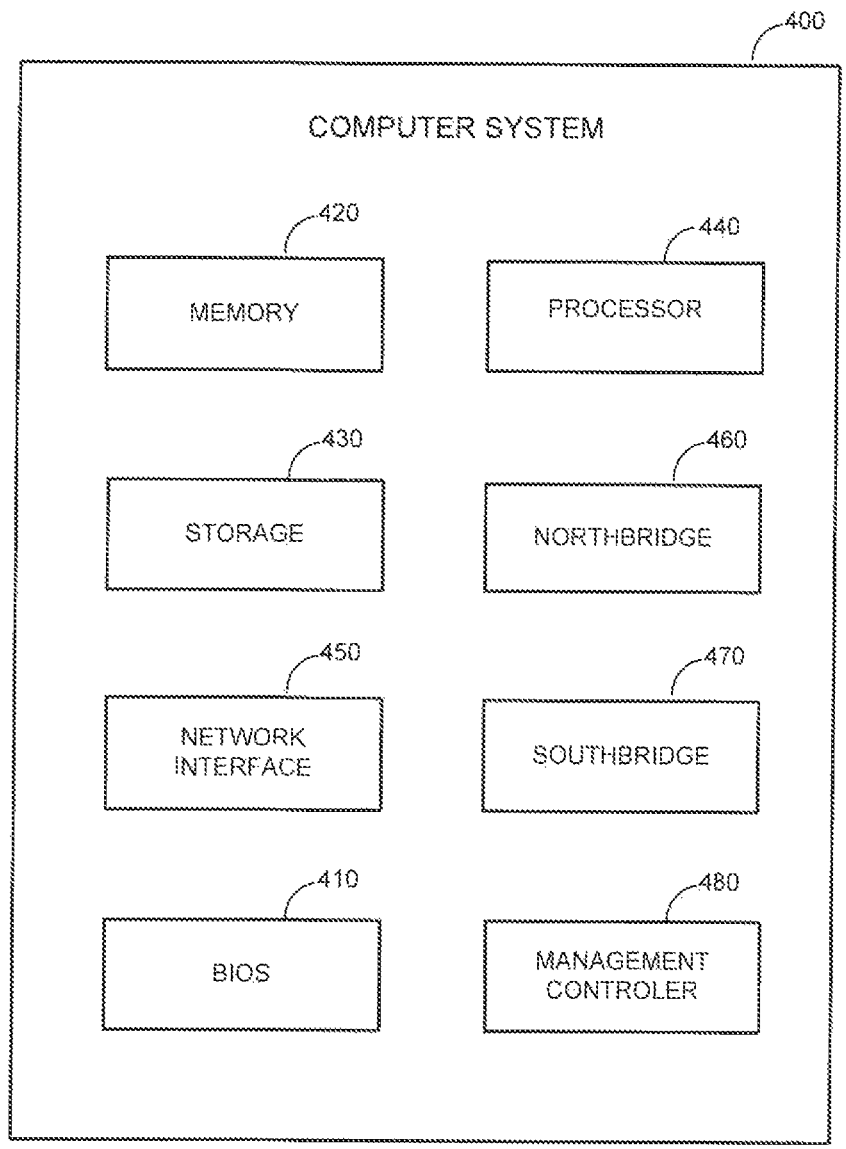
FIG. 4 illustrates a block diagram of an example computer system.

FIG. 4 illustrates a block diagram of an example computer system 400. The computer system 400 includes a processor 440, a network interface 450, a management controller 480, a memory 420, a storage 430, a BIOS 410, a northbridge 460, and a southbridge 470.

The computer system 400 is, for example, a server (e.g., a server in a server rack of a data center) or a personal computer. The processor (e.g., central processing unit (CPU)) 440 is a chip on a motherboard that retrieves and executes programming instructions stored in the memory 420. The processor 440 is a single CPU with a single processing core, a single CPU with multiple processing cores, or multiple CPUs. One or more buses (not shown) transmit instructions and application data between various computer components such as the processor 440, memory 420, storage 430, and networking interface 450.

The memory 420 includes any physical device used to temporarily or permanently store data or programs, such as various forms of random-access memory (RAM). The storage 430 includes any physical device for non-volatile data storage such as a HDD or a flash drive. The storage 430 can have a greater capacity than the memory 420 and can be more economical per unit of storage, but can also have slower transfer rates.

The BIOS 410 includes a Basic Input/Output System or its successors or equivalents, such as an Extensible Firmware Interface (EFI) or Unified Extensible Firmware Interface (UEFI). The BIOS 410 includes a BIOS chip located on a motherboard of the computer system 400 storing a BIOS software program. The BIOS 410 stores firmware executed when the computer system is first powered on along with a set of configurations specified for the BIOS 410. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 410 is loaded and executed as a sequence program each time the computer system 400 is started. The BIOS 410 recognizes, initializes, and tests hardware present in a given computing system based on the set of configurations. The BIOS 410 performs self-test, such as a Power-on-Self-Test (POST), on the computer system 400. This self-test tests functionality of various hardware components such as hard disk drives, optical reading devices, cooling devices, memory modules, expansion cards and the like. The BIOS addresses and allocates an area in the memory 420 in to store an operating system. The BIOS 410 then gives control of the computer system to the OS.

The BIOS 410 of the computer system 400 includes a BIOS configuration that defines how the BIOS 410 controls various hardware components in the computer system 400. The BIOS configuration determines the order in which the various hardware components in the computer system 400 are started. The BIOS 410 provides an interface (e.g., BIOS setup utility) that allows a variety of different parameters to be set, which can be different from parameters in a BIOS default configuration. For example, a user (e.g., an administrator) can use the BIOS 410 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 480 is a specialized microcontroller embedded on the motherboard of the computer system. For example, the management controller 480 is a baseboard management controller (BMC). The management controller 480 manages the interface between system management software and platform hardware. Different types of sensors built into the computer system report to the management controller 480 on parameters such as temperature, cooling fan speeds, power status, operating system status, etc. The management controller 480 monitors the sensors and has the ability to send alerts to an administrator via the network interface 450 if any of the parameters do not stay within preset limits, indicating a potential failure of the system. The administrator can remotely communicate with the management controller 480 to take some corrective action such as resetting or power cycling the system to restore functionality.

The northbridge 460 is a chip on the motherboard that can be directly connected to the processor 440 or is integrated into the processor 440. In some instances, the northbridge 460 and the southbridge 470 is combined into a single die. The northbridge 460 and the southbridge 470, manage communications between the processor 440 and other parts of the motherboard. The northbridge 460 manages tasks that require higher performance than the southbridge 470. The northbridge 460 manages communications between the processor 440, the memory 420, and video controllers (not shown). In some instances, the northbridge 460 includes a video controller.

The southbridge 470 is a chip on the motherboard connected to the northbridge 460, but unlike the northbridge 460, need not be directly connected to the processor 440. The southbridge 470 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 400. The southbridge 470 connects to or includes within the southbridge 470 the management controller 470, Direct Memory Access (DMAs) controllers, Programmable Interrupt Controllers (PICs), and a real-time clock. In some instances, the southbridge 470 directly connects to the processor 440, such as in the case where the northbridge 460 is integrated into the processor 440.

The networking interface 550 is any interface that supports Local Area Networks (LANs) or Wide Area Networks (WANs), such as Ethernet, Fibre Channel, WI-FI, BLUETOOTH, FIREWIRE, the Internet, etc. For example, the networking interface 50 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A system for offloading server management traffic, comprising:
   a data port;
   an out-of-band port; and
   a leaf switch comprising:
      a processor;
      a switch integrated circuit; and
      an unmanaged chip directly connected to the switch integrated circuit, wherein the unmanaged chip is a physical circuit, and wherein management connectivity of the unmanaged chip is independent of the processor,
   the switch integrated circuit configured to direct data traffic to the data port and offload baseboard management controller (BMC) traffic to the unmanaged chip,
   the unmanaged chip configured to direct the BMC traffic to the out-of-band port.

2. The system of claim 1, wherein the unmanaged chip is further configured to direct switch management traffic to the out-of-band port.

3. The system of claim 1, wherein the unmanaged chip is configured to direct the BMC traffic to the out-of-band port using a media access control (MAC) table and a virtual local area network (VLAN) configuration.

4. The system of claim 1, further comprising a processor and a BMC, wherein the BMC is connected to the processor.

5. The system of claim 1, further comprising a processor, wherein the unmanaged chip is connected to the processor.

6. The system of claim 1, wherein the unmanaged chip is connected to the switch integrated circuit.

7. The system of claim 1, wherein the leaf switch is located in a top-of-rack (TOR).

8. The system of claim 1, wherein the unmanaged chip is further configured to direct inbound management traffic from the out-of-band port to the switch integrated circuit and the switch integrated circuit is further configured to direct the inbound management traffic to the management controller.

9. A method for offloading server management traffic, comprising:
   directing, by a switch integrated circuit of a leaf switch, data traffic to a data port, the leaf switch further comprising a processor;
   offloading, by the switch integrated circuit, baseboard management controller (BMC) traffic to an unmanaged chip of the leaf switch, wherein the unmanaged chip is directly connected to the switch integrated circuit, wherein management connectivity of the unmanaged chip is independent of the processor, and wherein the unmanaged chip is a physical circuit; and
   directing, by the unmanaged chip, the BMC traffic to an out-of-band port.

10. The method of claim 9, further comprising directing, by the unmanaged chip, switch management traffic to the out-of-band port.

11. The method of claim 9, wherein the unmanaged chip uses a media access control (MAC) table and a virtual local area network (VLAN) configuration to direct the BMC traffic to the out-of-band port.

12. A system for offloading server management traffic, comprising:
   a data port;
   an out-of-band port;
   a leaf switch comprising:
      a processor;
      a switch integrated circuit connected to the processor; and
      an unmanaged chip connected to the processor and directly connected to the switch integrated circuit, wherein the unmanaged chip is a physical circuit, and wherein management connectivity of the unmanaged chip is independent of the processor,
   the switch integrated circuit configured to direct data traffic to the data port and offload baseboard management controller (BMC) traffic to the unmanaged chip, the unmanaged chip configured to direct the BMC traffic to the out-of-band port, and
a BMC connected to the processor and to the unmanaged chip.

13. The system of claim 12, wherein the unmanaged chip is further configured to direct switch management traffic to the out-of-band port.

14. The system of claim 12, wherein the unmanaged chip uses a media access control (MAC) table and a virtual local area network (VLAN) configuration to direct the BMC traffic to the out-of-band port.

15. The system of claim 12, further comprising a processor and a BMC, wherein the BMC is connected to the processor using a universal asynchronous receiver/transmitter (UART) interface.

16. The system of claim 12, further comprising a processor, wherein the unmanaged chip is connected to the processor using a serial gigabit media independent interface (SGMII) interface or a serializer/deserializer (SerDes) interface.

17. The system of claim 12, wherein the unmanaged chip is connected to the switch integrated circuit using an Ethernet interface.

18. The system of claim 12, wherein the leaf switch is located in a top-of-rack (TOR).

19. The system of claim 12, wherein the unmanaged chip is further configured to direct inbound management traffic from the out-of-band port to the switch integrated circuit and the switch integrated circuit is further configured to direct the inbound management traffic to the management controller.

20. The system of claim 12, wherein the unmanaged chip is directly connected to the out-of-band port, and wherein the unmanaged chip is connected to a management server, via the out-of-band port, using an out-of-band connection.

21. The system of claim 12, wherein the unmanaged chip is configured to use a MAC table and a virtual local area network (VLAN) configuration to direct traffic from the BMC to the out-of-band port.

* * * * *